(12) United States Patent
Bergeron et al.

(10) Patent No.: US 12,726,751 B1
(45) Date of Patent: Sep. 1, 2026

(54) FABRIC-BASED EARBUDS

(71) Applicant: Apple Inc., Cupertino, CA (US)

(72) Inventors: Kathleen A Bergeron, Los Gatos, CA (US); Daniel A Podhajny, Morgan Hill, CA (US); Joseph B Walker, Campbell, CA (US)

(73) Assignee: Apple Inc., Cupertino, CA (US)

( * ) Notice: Subject to any disclaimer, the term of this patent is extended or adjusted under 35 U.S.C. 154(b) by 518 days.

(21) Appl. No.: 18/171,107

(22) Filed: Feb. 17, 2023

Related U.S. Application Data

(60) Provisional application No. 63/318,337, filed on Mar. 9, 2022.

(51) Int. Cl.

| | |
|---|---|
| ***H04R 1/10*** | (2026.01) |
| ***D03D 25/00*** | (2006.01) |
| ***G06F 30/12*** | (2020.01) |
| ***G06F 111/16*** | (2020.01) |
| ***G06F 113/10*** | (2020.01) |

(52) U.S. Cl.
CPC ......... *H04R 1/1016* (2013.01); *D03D 25/005* (2013.01); *G06F 30/12* (2020.01); *H04R 1/1058* (2013.01); *D10B 2403/033* (2013.01); *G06F 2111/16* (2020.01); *G06F 2113/10* (2020.01); *H04R 2201/029* (2013.01)

(58) Field of Classification Search
CPC ................ H04R 1/1016; H04R 1/1058; H04R 2201/029; D03D 25/005; G06F 30/12; G06F 2111/16; G06F 2113/10; D10B 2403/033
USPC .......................................................... 381/380
See application file for complete search history.

(56) References Cited

U.S. PATENT DOCUMENTS 4,665,909 A * 5/1987 Trainor ................. A61F 15/006 602/76
8,286,668 B2 10/2012 Teng et al.
(Continued)

OTHER PUBLICATIONS

Brittney Sevenson, Art Student Creates Patent Pending 3D Printer/Weaving Machine, Jun. 5, 2014, 3DPrint.com <url:https://3dprint.com/7156/3d-weaving-machine/> (Year: 2014).*
(Continued)

*Primary Examiner* — Fan S Tsang
*Assistant Examiner* — Sean Rinehart
(74) *Attorney, Agent, or Firm* — Treyz Law Group, P.C.; Kendall P. Woodruff

(57) ABSTRACT

A three-dimensional weaving system may be used to form customized earbuds for a user. An electronic device with a three-dimensional sensor may be used to capture three-dimensional images of one or both of the user's ears. The three-dimensional ear images may be provided to computing equipment that analyzes the images to determine the dimensions of the ear such as tragus and antitragus dimensions and concha dimensions. Three-dimensional weaving equipment may be used to weave customized earbuds for the user based on the ear images. The customized earbuds may include a tragus and antitragus portion that matches the dimensions of the tragus and antitragus in the ear images, as these areas of the ear are more sensitive. The concha portion of the customized earbuds may be woven with slightly larger dimensions than the user's actual concha, as the concha area can withstand some compression without discomfort.

20 Claims, 10 Drawing Sheets

(56) References Cited

U.S. PATENT DOCUMENTS

| | | | | |
|---|---|---|---|---|
| 8,361,911 | B2 | 1/2013 | Legrand et al. | |
| 8,505,588 | B2 | 8/2013 | Coupe et al. | |
| 9,598,798 | B2 | 3/2017 | Potluri et al. | |
| 10,519,576 | B2 | 12/2019 | Marchal et al. | |
| 2007/0036383 | A1* | 2/2007 | Romero | H04R 1/1016 381/370 |
| 2016/0305050 | A1* | 10/2016 | Winner | D03D 11/02 |
| 2017/0078785 | A1* | 3/2017 | Qian | H04R 1/105 |
| 2017/0247820 | A1* | 8/2017 | Podhajny | D03D 1/0088 |
| 2017/0356478 | A1* | 12/2017 | Guest | B64C 21/10 |
| 2019/0218693 | A1* | 7/2019 | Tassell | D03D 13/002 |
| 2021/0113899 | A1 | 4/2021 | Caron Kardos et al. | |
| 2021/0228779 | A1* | 7/2021 | Knothe Tate | B33Y 10/00 |
| 2022/0159362 | A1* | 5/2022 | Kirkpatrick | H04R 1/105 |
| 2022/0356611 | A1* | 11/2022 | Laine | D03D 41/004 |

OTHER PUBLICATIONS

Brittney Sevenson, Researchers Create 3D Felting Printer: Produces soft cuddly objects, Apr. 28, 2014, 3DPrint.com <url:https://3dprint.com/2861/3d-felting-printer/> (Year: 2014).*

* cited by examiner

FABRIC-BASED EARBUDS

This application claims priority to provisional patent application No. 63/318,337, filed Mar. 9, 2022, which is hereby incorporated by reference herein in its entirety.

FIELD

This relates generally to fabric and, more particularly, to fabric-based electronic devices.

BACKGROUND

It may be desirable to form voice-controlled assistant devices, earbuds, headphones, bags, covers for electronic devices such as cellular telephones and tablet computers, and other equipment from fabric. Fabric-based items such as these may have an attractive appearance and may benefit from desirable attributes associated with fabric such as sound permeability, light weight, and durability.

Challenges may arise when using woven fabric to form three-dimensional structures. Most weaving machines are only capable of producing two-dimensional fabrics. Three-dimensional structures can be formed by stitching multiple pieces of two-dimensional fabric together, but this may lead to unsightly seams and other undesirable characteristics.

SUMMARY

A three-dimensional weaving system may be used to form customized earbuds for a user. An electronic device with a three-dimensional sensor may be used to capture three-dimensional images of one or both of the user's ears. The three-dimensional ear images may be provided to computing equipment that analyzes the images to determine the dimensions of the ear such as tragus and antitragus dimensions and concha dimensions. Three-dimensional weaving equipment may be used to weave customized earbuds for the user based on the ear images. The customized earbuds may include a tragus and antitragus portion that matches the dimensions of the tragus and antitragus in the ear images, as these areas of the ear are more sensitive. The concha portion of the customized earbuds may be woven with slightly larger dimensions than the user's actual concha, as the concha area can withstand some compression without discomfort.

A three-dimensional weaving system for weaving customized fabric-based earbuds may use a weaving process in which the warp laying operations are decoupled from the weft insertion operations. The weaving system may include warp laying equipment, weft insertion equipment, and an array of needles. The warp laying equipment may include a warp strand positioner that guides warp strand segments around the array of needles to form a stack of warp loops on the array of needles. After laying all of the warp strand segments, weft insertion equipment may be used to insert weft strand segments through the stack of warp loops. The needles may include first and second ends with respective first and second eyelets. A weft strand segment may be threaded through the first eyelet. A hook may hook through the second eyelet of the needle and may pull the needle out of the stack of warp loops, leaving the weft strand segment in its place. This process may be repeated until all of the weft strand segments have been inserted across the warp strand segments. Some or all of the warp strand segments and/or some or all of the weft strand segments may be formed from a single continuous strand.

DETAILED DESCRIPTION

Figure 1:
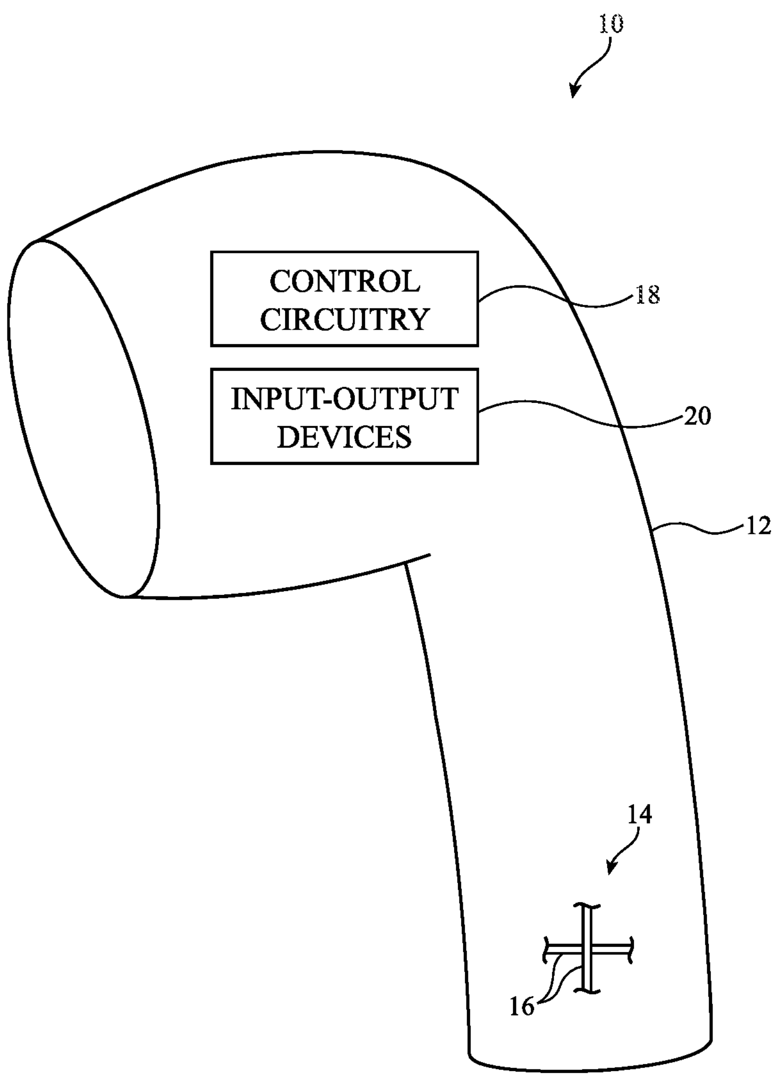
FIG. 1 is a perspective view of an illustrative fabric-based item such as an earbud having a housing covered with a fabric layer in accordance with an embodiment.

Items such as item 10 of FIG. 1 may be based on fabric. Item 10 may be an electronic device or an accessory for an electronic device such as an earbud, a voice-controlled electronic device (sometimes referred to as a digital assistant or voice-controlled speaker), a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which fabric-based item 10 is mounted in a kiosk, in an automobile, airplane, or other vehicle, other electronic equipment, or equipment that implements the functionality of two or more of these devices. If desired, item 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, shirt, pants, shoes, etc.), or may be any other suitable fabric-based item. In the illustrative configuration of FIG. 1, item 10 is an earbud having a speaker for providing audio to a user's ear. Other types of devices may incorporate fabric, if desired.

As shown in FIG. 1, item 10 may include a housing such as housing 12. Housing 12 may have an earbud shape of the type shown in FIG. 1, a headphones shape, a cylindrical shape, a spherical shape, or other suitable shape (e.g., a pyramidal shape, a conical shape, a box shape such as a rectangular box shape, etc.). Housing 12 may include support structures formed from metal, polymer, ceramic, glass, wood, other materials, and/or combinations of these materials. Item 10 may include fabric 14. Fabric 14 may form all or part of a housing wall or other layer in an electronic device, may form internal structures in an electronic device, or may form other fabric-based structures. Item 10 may be soft (e.g., item 10 may have a fabric surface that yields to a light touch), may have a rigid feel (e.g., the surface of item 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials. For example, some or all of the upper surface of housing 12, the sidewall surfaces of housing 12, surfaces associated with lower portions of housing 12, and/or other portions of item 10 may be covered with fabric 14. In some configurations, fabric 14 may serve as a cosmetic cover for item 10 that is permeable to sound.

Fabric 14 may include intertwined strands of material such as strands 16. Fabric 14 may, for example, be woven fabric that is formed by weaving strands 16. Strands 16 may be single-filament strands (sometimes referred to as fibers or monofilaments) or may be strands of material formed by intertwining multiple monofilaments of material together (sometimes referred to as yarns).

Strands 16 may be formed from polymer, metal, glass, graphite, ceramic, natural materials such as cotton or bamboo, or other organic and/or inorganic materials and combinations of these materials. Conductive coatings such as metal coatings may be formed on non-conductive material. For example, plastic strands in fabric 14 may be coated with metal to make them conductive. Reflective coatings such as metal coatings may be applied to make strands reflective. Strands may be formed from bare metal wires or metal wire intertwined with insulating monofilaments (as examples). Bare metal strands and strands of polymer covered with conductive coatings may be provided with insulating polymer jackets.

Items such as item 10 may, if desired, include control circuitry 18. Control circuitry 18 may include microprocessors, microcontrollers, application-specific integrated-circuits, digital signal processors, baseband processors, and/or other controllers and may include storage such as random-access memory, read-only memory, and/or other storage and processing circuitry.

Control circuitry 18 may gather information from sensors and other circuitry in input-output devices 20 and may use input-output devices 20 to supply output. Input-output devices 20 may, for example, include audio devices such as microphones and speakers. Microphones can gather audio input (e.g., sound that passes through fabric 14). Speakers can produce audio output (e.g., sound that passes through fabric 14). Sensors in input-output devices 20 may include touch sensors, force sensors, capacitive sensors, optical sensors, proximity sensors, strain gauges, temperature sensors, moisture sensors, gas sensors pressure sensors, magnetic sensors, position and orientation sensors (e.g., accelerometers, gyroscopes, and/or compasses), heart rate sensors such as photoplethysmography (PPG) sensors and other medical sensors, and/or other sensors. Light-emitting diodes, displays, and other visual output devices may be used in supply visual output to a user. Buttons, joysticks, haptic output components, and/or other input-output components may be provided in input-output devices 20 to gather input from a user and to provide a user with output. Wireless circuitry in circuitry 18 (e.g., wireless local area network circuitry, cellular telephone circuitry, etc.) may be used to support wireless communications with external equipment.

Integrated circuits and other electrical components forming circuitry 18 and/or input-output devices 20 may be mounted in housing 12. Fabric 14 may cover the exterior of housing 12 (e.g., to hide electrical components in housing 12 from view). Fabric 14 may also be used in forming structural portions of housing 12 and/or other portions of item 10, may be used in forming straps, covers, wearable items, and/or other structures for item 10.

To enhance user comfort, portions of an earbud may be soft to the touch, may be adjustable, and/or may be customized for a specific user. For example, an earbud may be customized for a user using three-dimensional weaving techniques. Customization operations can be facilitated by gathering three-dimensional images of a user's ear cavity. For example, a three-dimensional image of a user's ear cavity may be captured to determine the dimension and shape of the ear. Three-dimensional weaving techniques may be used to produce customized earbuds based on the three-dimensional images of the user's ear cavities. The customized earbuds may include customized dimensions, customized materials, and/or other customized features based on the specific anatomy of the user's ear.

Figure 2:
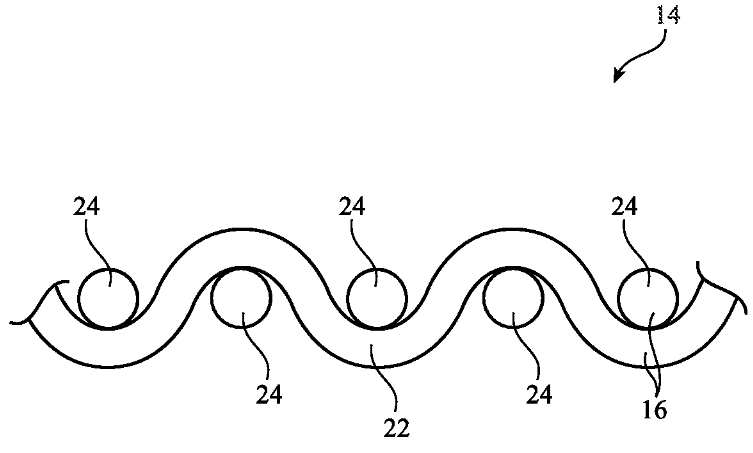
FIG. 2 is a cross-sectional side view of an illustrative fabric having warp and weft strands in accordance with an embodiment.

A cross-sectional side view of illustrative woven fabric 14 is shown in FIG. 2. As shown in FIG. 2, fabric 14 may include strands 16. Strands 16 may include warp strands 24 and weft strands 22. If desired, additional strands that are neither warp nor weft strands may be incorporated into fabric 14. The example of FIG. 2 is merely illustrative. In the illustrative configuration of FIG. 2, fabric 14 has a single layer of woven strands 16. Multi-layer fabric constructions may be used for fabric 14 if desired.

In one illustrative arrangement, fabric 14 of earbud 10 may be created pick-by-pick by inserting weft strands across warp strands and changing positions of the warp strands after each weft insertion. In another illustrative arrangement, woven fabric 14 of earbud 10 may be a three-dimensional woven fabric that uses a different weaving technique in which the warp laying process is decoupled from the weft insertion process. By laying all of the warp strands (or warp strand segments of a single warp strand) first and then inserting all of the weft strands (or weft strand segments of a single weft strand), complex three-dimensional fabrics (e.g., spheres, donuts, baskets, earbud shapes, compound corner shapes, wavy shapes, seamless bands with integrated components, fabric with customized levels of stretch and/or breathability, multi-diameter tubes, multi-layer fabrics, spacer fabrics, textured surfaces, braids, etc.) may be formed without requiring seams or stitches. Additionally, a single continuous strand may be used to form some or all of the warps and/or some or all of the wefts in the woven fabric, thus eliminating the need to use warp beams while also allowing for finished warp ends and finished weft ends (e.g., finished ends without stitches). The ability to create complex shapes with three-dimensional weaving equipment allows for a wide range of products to created, such as three-dimensionally woven earbuds, automobile structures and interiors, shoes, clothing, cases and/or housing structures for cellular telephones, computers, laptops, tablets, head-mounted devices, and/or any other suitable electronic device, and/or other three-dimensionally woven items.

Figure 3:
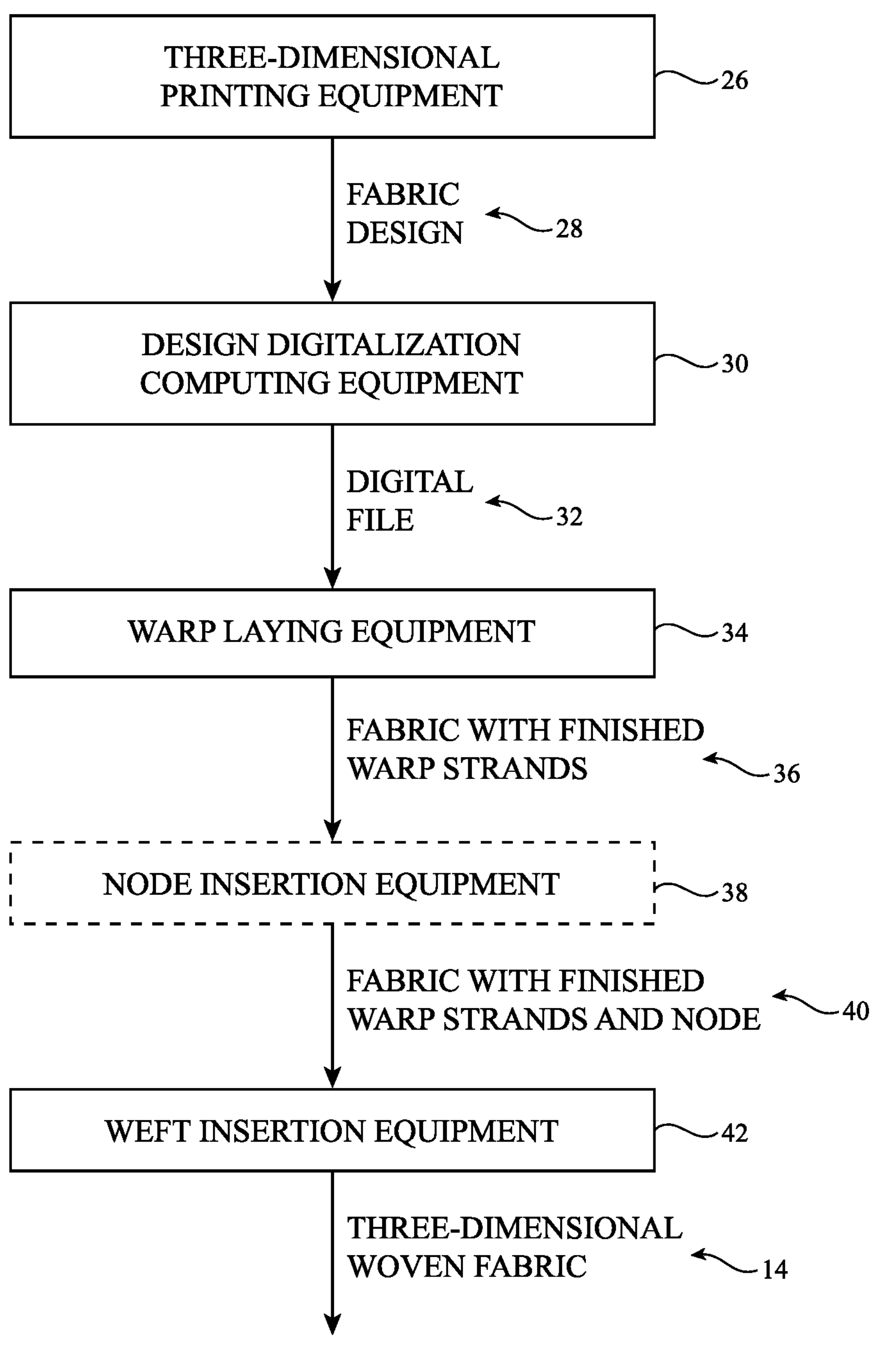
FIG. 3 is a diagram of illustrative equipment that may be used to form three-dimensional woven fabric in accordance with an embodiment.

FIG. 3 is a diagram of illustrative equipment (e.g., a system) that may be used to produce three-dimensional woven fabric (e.g., for a customized fabric-based earbud) using decoupled warp laying and weft insertion operations. As shown in FIG. 3, optional three-dimensional printing equipment 26 may be used to produce a three-dimensionally printed item. This in turn may be used to produce a fabric design such as fabric design 28. For example, if it is desired to produce a three-dimensionally woven fabric having an earbud shape of the type shown in FIG. 1, printing equipment 26 may be used to print a three-dimensional model of the desired earbud shape. This three-dimensional model may be reduced into two-dimensions to produce fabric design 28 (e.g., a two-dimensional fabric design pattern). If desired, design 28 may be generated without printing equipment 26 and/or without producing a three-dimensional model first. The example of FIG. 3 is merely illustrative.

Design 28 may, for example, be based on a three-dimensional image of a user's ear so that earbud 10 formed by fabric 14 is customized for the user's ear. Computing equipment (e.g., computing equipment associated with an electronic device that captured the ear image, computing equipment associated with the weaving equipment of FIG. 3, computing equipment associated with a remote server, and/or any other suitable computing equipment) may receive the ear image (e.g., a three-dimensional image of a user's ear) and may analyze the image to determine ear features such as dimensions of the tragus, antitragus, and concha bowl. Design 28 may be an earbud design that is based on the dimensions of the user's ear. For example, design 28 may include tragus and antitragus portions and concha bowl portions with dimensions that are based on ear dimensions measured from the three-dimensional ear image. The antitragus and tragus portions of the ear may be more sensitive than other parts of the ear such as the concha bowl. If desired, tragus and antitragus portions of design 28 of earbud 10 may have dimensions that match line-to-line or with a modest level of clearance with the dimensions of the user's ear to avoid user discomfort. In contrast, concha bowl portions of design 28 of earbud 10 need not match line-to-line with the dimensions of the user's concha bowl. Since the concha is typically less sensitive than other parts of the ear, some compressive force in this region may be acceptable and may help hold earbud 10 within the ear. As such, design 28 may have a concha bowl portion with slightly larger dimensions than the user's concha bowl, if desired.

Computing equipment such as design digitalization computing equipment 30 may be used to digitalize fabric design 28 into a digital file such as digital file 32. For example, computing equipment 30 may generate a three-dimensional weaving file that includes information about the location of warp strands and weft strands relative to the machine on which the woven fabric 14 will be formed (e.g., when and where to place warp strand segments 24 and when and where to place weft strand segments 22 during weaving). If desired, the three-dimensional weaving file may be converted into instructions for computer-controlled positioners that control the weaving machine and other equipment during weaving operations. For example, a computer-controlled warp positioner may be moveable along three dimensions (e.g., x, y, and z dimensions) and digital file 32 may include directions for when and how much to move along the x, y, and z dimensions during weaving operations so that the warp strands follow the desired path.

Warp laying equipment 34 may receive digital file 32 and may be used to lay warp strands and/or warp strand segments in desired locations based on the instructions in digital file 32. Warp laying equipment 34 may include one or more strand sources, one or more tension control devices for controlling tension of the warp strands 24, one or more warp feeders for feeding and positioning warp strands 24, one or more needle arrays around which warp strands 24 may be guided during warp laying operations, one or more support plates for supporting the needle arrays during warp laying operations, and/or one or more computer-controlled positioners for positioning different components in equipment 34. If desired, a single warp strand 24 may be used to form some or all of the warps in fabric 14, meaning that a single continuous warp strand 24 may be stacked on top of itself to form multiple rows of warp strand segments on the needle array. This is merely illustrative, however. If desired, multiple individual warp strands 24 may be used to form the warps of fabric 14. Warp laying equipment 34 may be used to produce fabric 36 with finished warp strands (e.g., fabric edges with finished warp ends and no stitches).

If desired, optional node insertion equipment 38 may be used to insert one or more electrical components (sometimes referred to as nodes) into fabric 36 after warp laying equipment 34 has laid all of warp strands 24. Electrical components may be inserted into pockets and/or other locations in the fabric. Electrical components may be electrically and/or mechanically coupled (e.g., soldered) to strands in the fabric such as conductive strands that convey electrical signals to and/or from the electrical component. The electrical component may have one or more grooves for receiving conductive strands such as conductive warp strand segments that are laid using equipment 34. If desired, equipment 38 may include insulation removal equipment (e.g., one or more lasers, inductive heating elements, etc.) for removing an outer insulating coating to expose an inner conductive core. The electrical component may be soldered to the conductive core to form an electrical and mechanical connection between the electrical component and the fabric.

Electrical components that may optionally be incorporated into fabric using equipment 38 may include discrete electrical components such as resistors, capacitors, and inductors, may include connectors, may include batteries, may include input-output devices such as switches, buttons, light-emitting components such as light-emitting diodes, audio components such as microphones and speakers, vibrators (e.g., piezoelectric actuators that can vibrate), solenoids, electromechanical actuators, motors, and other electromechanical devices, microelectromechanical systems (MEMs) devices, pressure sensors, light detectors, proximity sensors (light-based proximity sensors, capacitive proximity sensors, etc.), force sensors (e.g., piezoelectric force sensors), strain gauges, moisture sensors, temperature sensors, accelerometers, gyroscopes, compasses, magnetic sensors (e.g., Hall effect sensors and magnetoresistance sensors such as giant magnetoresistance sensors), touch sensors, and other sensors, components that form displays, touch sensor arrays (e.g., arrays of capacitive touch sensor electrodes to form a touch sensor that detects touch events in two dimensions), and other input-output devices, energy storage devices, electrical components that form control circuitry such as non-volatile and volatile memory, microprocessors, application-specific integrated circuits, system-on-chip devices, baseband processors, wired and wireless communications circuitry, and other integrated circuits.

Following node insertion, fabric 40 with finished warp strands and optionally inserted node(s) may proceed to weft insertion operations. In some arrangements, electrical components may not be incorporated into fabric 14 and node insertion equipment 38 may be omitted. In this case, weft insertion operations may take place using fabric 36.

Weft insertion equipment 42 may be used to insert weft strands 22 (and/or weft strand segments 22) across warp strands 24 that were laid using warp laying equipment 34. Weft insertion equipment 42 may include one or more hooks for pulling weft strands 22 through loops formed by warp strands 24. If desired, weft strands 22 may be looped through eyelets at the end of each needle around which warp strands 24 are laid, so that pulling a needle out of the warp strand stack causes a weft strand to be threaded through the warp strand stack. In other words, threading a weft strand through each needle and pulling the needle out of the warp strand stack causes the weft strand to be woven with the warp strand stack. After all of the needles have been removed, the resulting woven warp strands 24 and weft strands 22 may form three-dimensional woven fabric 14 having the desired shape (e.g., a spherical shape, a donut shape, a basket shapes, an earbud shape, a shape with compound corners, a wavy shape, a seamless band shape, a tube shape with different diameters, a braid shape, a spacer fabric shape, and/or any other suitable shape). If desired, some or all of the warps and/or some or all of the wefts in fabric 14 may be formed from a single continuous strand.

Figure 4:
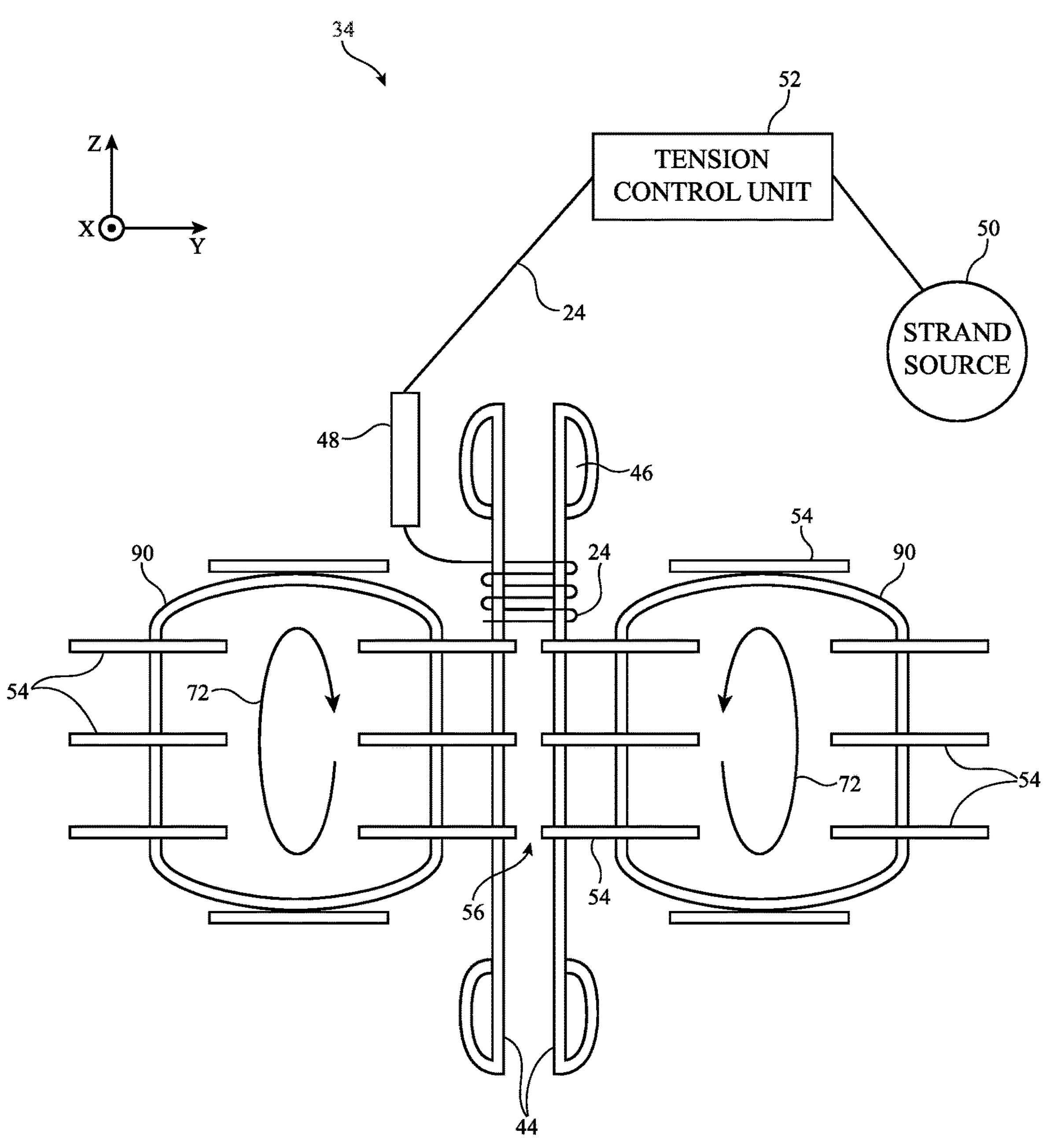
FIG. 4 is a diagram of illustrative warp laying equipment that may be used to lay warp strand segments in a three-dimensional fabric in accordance with an embodiment.

FIG. 4 is a diagram of illustrative warp laying equipment 34. As shown in FIG. 4, warp laying equipment 34 (sometimes referred to as warp strand positioning equipment) may include a strand source such as strand source 50. Strand source 50 in warp laying equipment 34 may be used in supplying strands 16 such as warp strands 24 to warp guiding structures such as one or more warp positioners 48. If desired, a tension control device such as tension control unit 52 may be used to control (e.g., adjust) the tension in warp strands 24 as the warp strands 24 are fed to warp positioner 48.

Warp laying equipment 34 may include an array of needles such as needles 44 around which warp strands 24 are guided. Needles 44 (sometimes referred to as pins) may each have an eyelet such as eyelet 46 at one or both ends of the needle. Eyelets 46 may be configured to receive weft strands 22 during weft insertion operations after all warp strands 24 have been laid. There may be any suitable number of needles 44 (e.g., two, four, six, eight, ten, twenty, more than twenty, less than twenty, etc.). Needles 44 may be arranged in one or more rows. If desired, the number of needles 44 and the pattern in which needles 44 are arranged may change depending on the three-dimensional design of the fabric to be produced. Arrangements in which equipment 34 includes two rows of needles 44 are sometimes described herein as an illustrative example.

There may be one, two, three, or more than three warp positioners 48 for positioning warp strands 24 around needles 44. During warp laying operations, a controller may control electrically adjustable positioners in equipment 34 to manipulate the position of positioner 48 and to thereby dispense warp strands 24 around needles 48. Warp positioner 48 may move in any suitable direction (e.g., along x, y, and z axes of FIG. 4). In one illustrative arrangement, warp strand 24 is first guided around needles 44 to form a first layer of warp loops extending in the x-y plane of FIG. 4. Positioner 48 may then form a second layer of loops by again guiding warp strand 24 around needles 44 to form a second layer of warp loops in the x-y plane that is stacked on top of the first layer. Positioner 48 may keep guiding strand 24 around needles 44 to build a stack of warp layers in the z-direction, as shown in FIG. 4. Each layer of warp loops may be stacked on a previous layer of warp loops until all of the warp layers have been laid. The stack of warp loops may extend in the z-direction (e.g., along the longitudinal axis of needles 44), with each layer of loops extending in the x-y plane (e.g., perpendicular to the longitudinal axis of needles 44).

If desired, the same warp strand 24 may form some or all of the layers of warp loops in fabric 14. For example, after guiding a segment of a given warp strand 24 around needles 44 to form a first layer of warp loops, positioner 48 may guide a different segment of the same warp strand 24 around needles 44 to form a second layer of warp loops on top of the first layer of warp loops. The positioner 48 may continue using the same warp strand 24 to form all of the layers of warp loops in fabric 14, if desired. Using the same warp strand 24 to form multiple layers of warp loops in fabric 14 may provide finished warp ends. In other words, because the strand loops back into the fabric at the edges, the fabric edges are formed by closed warp loops rather than dead ends of individual warp strands. This is merely illustrative, however. Arrangements in which two or more warp strands 24 form the layers of warp loops in fabric 14 may also be used.

As layers of warp loops are laid onto needles 44, one or more support plates may be used to maintain relative positions of needles 44 to ensure that the stack of warp loops on needles 44 does not cause needles 44 to bend towards one another. As shown in FIG. 4, support plates 54 may be provided at intervals along the lengths of needles 44. First and second support plates 54 separated by a gap 56 may respectively be used to hold first and second rows of needles 44 in place. Plates 54 may have holes, grooves, or other recess features for receiving needles 44. Plates 54 may be provided between every few layers of warp loops (e.g., every two layers, every three layers, every ten layers, etc.). Plates 54 may be coupled to a conveyor such as conveyor structure 90. Conveyors 90 may rotate in directions 72 to place plates 54 at different locations along the lengths of needles 44 as the layers of warp loops are laid onto needles 44. For example, after laying a first stack of layers of warp loops around needles 44 (e.g., 5-10 layers, 2-20 layers, 10-30 layers, etc.), conveyers 90 may rotate in directions 72 to place a first plate 54 around a first row of needles 44 and a second plate 54 around a second row of needles 44, with the first and second plates being placed on top of the first stack of layers of warp loops that were previously laid on needles 44. After positioning plates 54 above the first stack of layers of warp loops, a second stack of layers of warp loops may be laid on needles 44 above the first and second plates 54. After the second stack of layers of warp loops is laid on needles 44, conveyors 90 may rotate again to place an additional pair of plates above the second stack of layers of warp loops. This process may continue until all warp layers have been laid.

Figure 5:
FIG. 5 is a top view of illustrative warp laying equipment guiding a warp strand segment around an array of needles in accordance with an embodiment.
Figure 5:
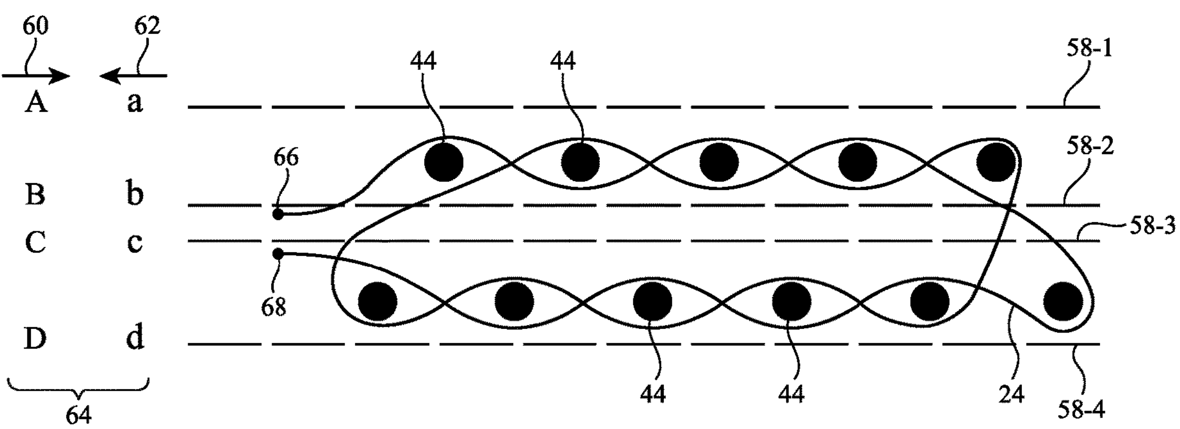

FIG. 5 is a top view of an illustrative layer of warp loops formed by warp laying equipment 34. Positioner 48 may begin the layer of warp loops with warp strand 24 in starting position 66 and may finish the layer of warp loops with warp strand 24 in end position 68. Positioner 48 may follow any suitable path with warp strand 24 around needles 44. Positioner 48 may, for example, follow a guide path that is determined by digital file 32 (FIG. 3). In particular, digital file 32 may include position and timing information indicating where warp strand 24 should be placed and when. In one illustrative configuration, the positioning and timing information may include letters such as letters 64. Letters 64 may represent locations relative to needles 44. For example, the letter "A" may indicate a position along line 58-1 (e.g., on a first side of a first row of needles 44); the letter "B" may indicate a position along line 58-2 (e.g., on a second side of the first row of needles); the letter "C" may indicate a position along line 58-3 (e.g., on a first side of a second row of needles); and the letter "D" may indicate a position along line 58-4 (e.g., on a second side of the second row of needles). Uppercase letters may indicate a movement in direction 60 (e.g., in the positive x-axis direction of FIG. 5), whereas lowercase letters may indicate a movement in direction 62 (e.g., in the negative x-axis direction of FIG. 5). Using this code, control signals may be provided to move positioner 48 along the desired path for warp strand 24. For example, the path followed by warp strand 24 of FIG. 5 may be represented by (2(AB)A2(dc)d2(BA)BC3(dc)). If desired, this pattern may be repeated for multiple layers of warp loops and/or the pattern may change for different layers of warp loops.

Figure 6:
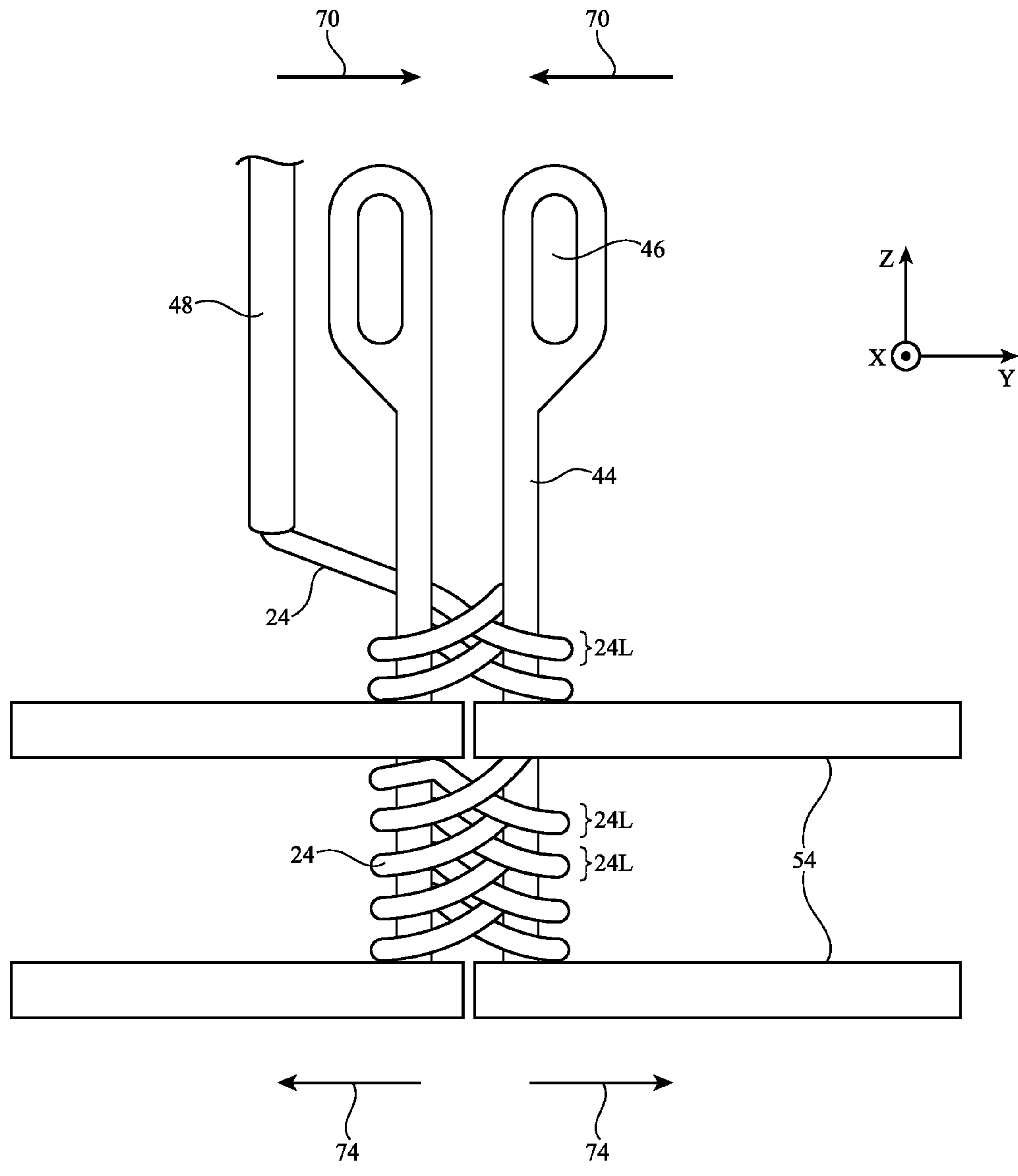
FIG. 6 is a side view of illustrative warp laying equipment having support plates for supporting an array of needles during warp laying operations in accordance with an embodiment.

FIG. 6 is a side view of warp laying equipment 34 showing how stacked layers of warp loops may be formed on needles 44 during warp laying operations. As shown in FIG. 6, layers 24L of warp loops on needles 44 may be stacked on top of one another in the z-direction (e.g., parallel to the length of needles 44). Each layer 24L may extend in the x-y plane of FIG. 6 (e.g., perpendicular to the length of needles 44). If desired, a single continuous warp strand 24 may be used to form some or all of warp layers 24L.

Plates 54 may be used to hold needles 44 in place relative to one another as warp layers 24L are laid to ensure that needles 44 do not bend towards one another in directions 70. When a given set of plates 54 is no longer needed (e.g., when all warp layers 24L have been laid and/or when plates 54 are located on a portion of needles 44 that no longer needs support), plates 54 may be removed (e.g., separated away from each other and needles 44 by moving in directions 74).

Figure 7:
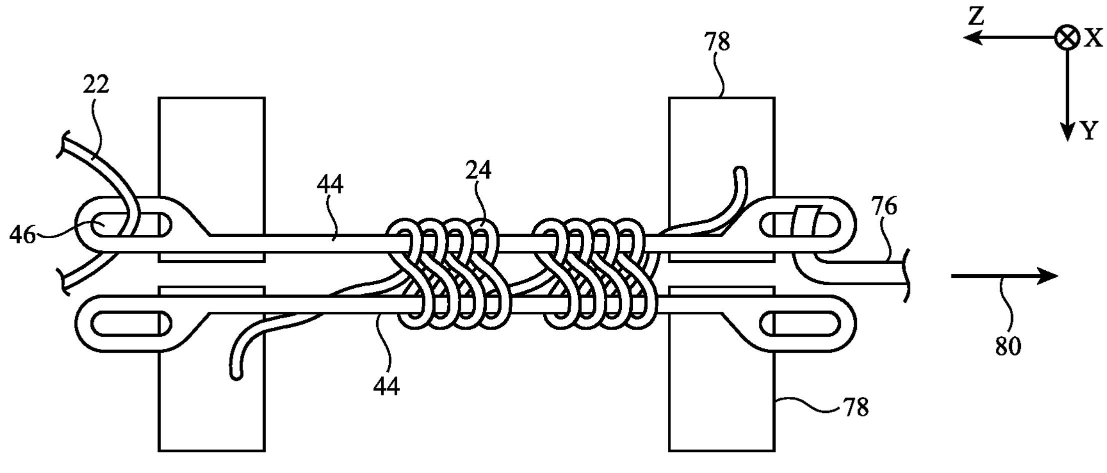
FIGS. 7, 8, and 9 are side views of illustrative weft insertion equipment showing how weft strand segments may be pulled through a stack of warp strand loops during weft insertion operations in accordance with embodiments.
Figure 8:
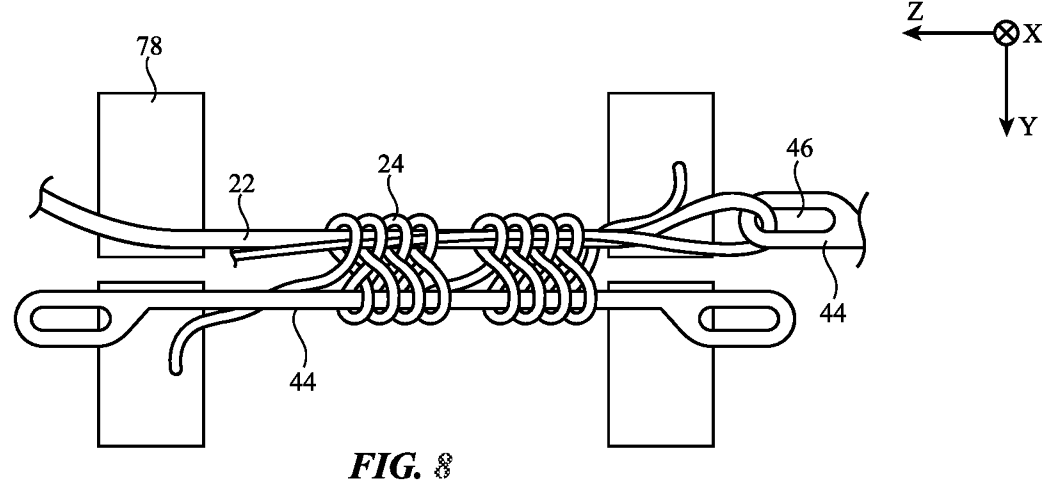
Figure 9:
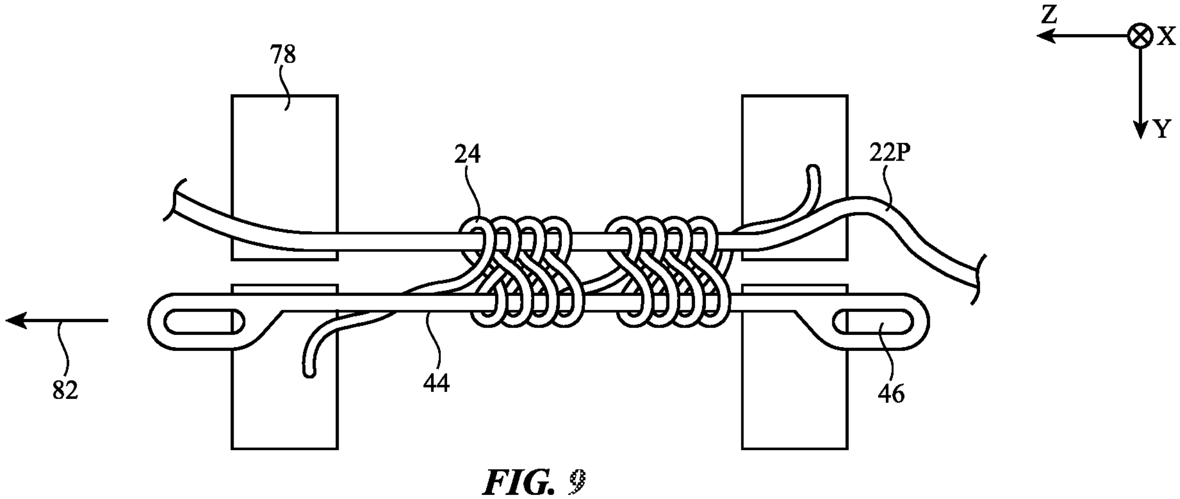

After warp laying operations are complete (e.g., when equipment 34 is finished forming fabric 36 with finished warp strands), weft insertion operations may begin. Illustrative steps associated with weft insertion operations are shown in FIGS. 7, 8, and 9. To help hold needles 44 in place without interfering with weft insertion operations, additional support structures such as support structures 78 (e.g., clamps, plates, etc.) may be temporarily attached to opposing ends of needles 44.

As shown in FIG. 7, the opposing ends of needles 44 around which warp strands 24 are laid have eyelets 46. Eyelets 46 may be configured to receive weft strands 22. During weft insertion operations, a given weft strand segment 22 may be threaded through eyelet 46 of a given needle 44. A hook such as hook 76 may be used to hook through eyelet 46 on the opposing end of needle 44. Hook 76 may pull needle 44 in direction 80, thereby causing weft strand segment 24 on the opposing end of needle 44 to be pulled through the stack of warp loops that are formed on that needle 44. This is illustrated in FIG. 8.

After pulling a first needle 44 and weft strand 22 all the way through the stack of warp loops on needle 44, a second needle 44 and weft strand 22 may be pulled through the stack of warp loops on the second needle 44. If desired, a single continuous weft strand 22 may form some or all of the weft layers of fabric 14. To achieve this, the weft strand 22 that is pulled through the stack of warp loops on the second needle 44 may be the same weft strand 22 that was pulled through the stack of warp loops on the first needle 44. For example, as shown in FIG. 9, segment 22P of weft strand 22 may be threaded through eyelet 46 of needle 44. Needle 44 may be pulled in direction 92 (e.g., by a hook such as hook 76 of FIG. 7) to thereby pull segment 22P of weft strand 22 through the stack of loops on needle 44 of FIG. 9. This is merely illustrative, however. If desired, multiple individual weft strands 22 may be respectively pulled through the stacks of warp loops on needles 44.

The process of FIGS. 7, 8, and 9 may be repeated with all of the needles 44 until weft strands 22 (e.g., a single weft strand 22 and/or multiple individual weft strands 22) have been threaded through all of the stacks of warp loops. If desired, a single continuous strand may be used to form both warp and weft strands in fabric 14. For example, a warp strand 24 that forms some or all of the stack of warp loops on needles 44 may be the same strand that is then threaded through eyelets 46 and pulled through the stack of warp loops to form a weft strand 22 in fabric 22. This is merely illustrative. If desired, warp strands 24 and weft strands 22 may be formed from different strands.

As needles 44 are removed and weft strands 22 are inserted in their place, three-dimensional fabric 14 may begin to take shape. Pulling some needles 44 through with weft strands 22 may cause resulting fabric to bend, curve, or otherwise move into place to form the desired three-dimensional shape. For example, layers 24L of warp loops may initially be stacked in a tube shape (e.g., a tube shape with uniform diameter in which individual layers 24L are formed using warp loops of the type shown in FIG. 5). As needles 44 are pulled out and weft strands 22 are inserted, the edges of the tube may be pulled in towards one another, thereby creating a multi-diameter tube, a spherical shape, a donut shape, a basket shape, and/or other shape.

In arrangements where fabric 14 includes conductive strands, the three-dimensional weaving techniques described above in connection with FIGS. 3-9 may be used to produce fabrics with embedded coils for wireless charging, heating, capacitive sensing, motors, and/or other coil-based electrical components in earbud 10. For example, conductive warp strands 24 may be laid on needles 44 in a pattern that creates a coil by moving positioner 48 in the appropriate directions during warp laying operations. Additionally or alternatively, conductive weft strands 22 may be inserted though warp layers to create a coil shape. Metal coils embedded in fabric 14 that are formed by conductive strands may be used to transmit and/or receive wireless power using inductive power transfer techniques and/or may be used form other electrical devices.

Three-dimensionally woven fabric 14 (e.g., fabric made using techniques of the type shown in FIGS. 3-9 and/or fabric formed using other three-dimensional weaving techniques) may be used to produce earbuds having any suitable shape. For example, three-dimensional fabric 14 may be used to produce customized earbuds that are custom-made for a user based on three-dimensional images of the user's ears. Images of the user's ears may be captured using one or more sensors in an electronic device. For example, a user may have an electronic device with an infrared depth sensor that is primarily used for face identification operations (e.g., when a user is unlocking a cellular telephone, authorizing a purchase, etc.). This type of sensor may be leveraged to capture three-dimensional images of the user's ears. Ear information such as ear images and/or ear measurements may be transmitted to external computing equipment and weaving equipment such as the three-dimensional weaving equipment of FIGS. 3-9. Customized fabric-based earbuds may be produced for the user based on the ear images and ear measurements.

Figure 10:
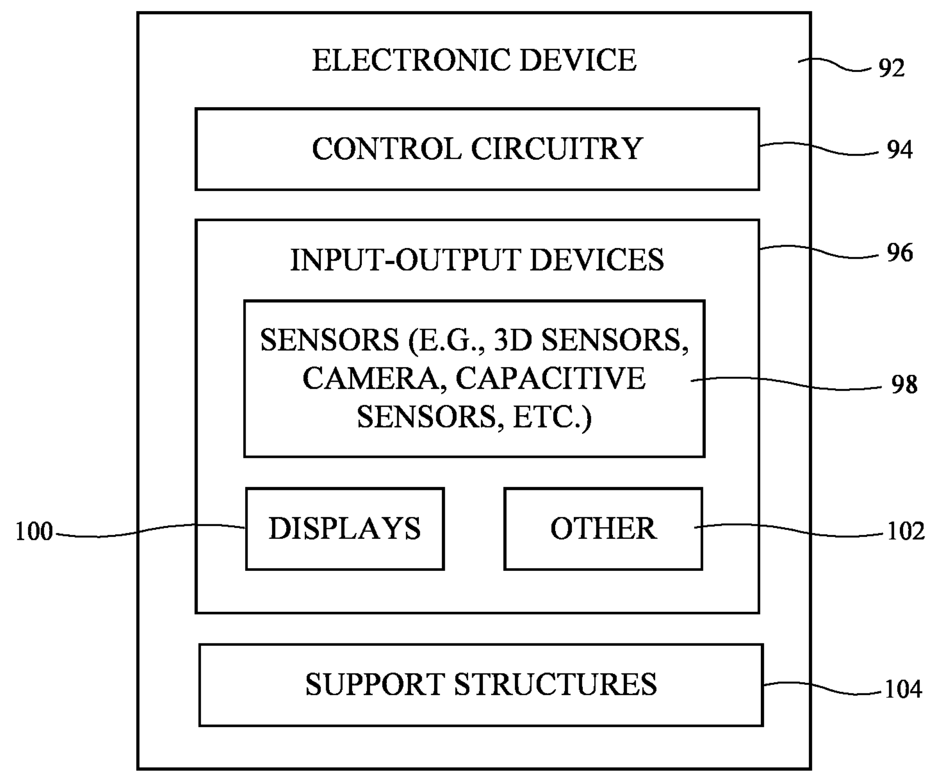
FIG. 10 is a schematic diagram of an illustrative electronic device with one or more sensors for ear mapping in accordance with an embodiment.

FIG. 10 is a schematic diagram of an illustrative electronic device that may be used to gather images and/or measurements of a user's ear for producing customized earbuds for the user. Electronic device 92 of FIG. 10 may be a computer, a cellular telephone, a tablet computer, a head-mounted device, a wristwatch device, and/or any other suitable electronic device.

As shown in FIG. 10, electronic device 92 may have control circuitry 94. Control circuitry 94 may include storage and processing circuitry for controlling the operation of device 92. Circuitry 94 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 94 may be based on one or more microprocessors, microcontrollers, digital signal processors, power management units, graphics processing units, application specific integrated circuits, and other integrated circuits. Software code may be stored on storage in circuitry 94 and run on processing circuitry in circuitry 94 to implement control operations for device 92 (e.g., data gathering operations, operations involved in processing three-dimensional facial image data, operations involving the adjustment of components using control signals, etc.). Control circuitry 94 may include wired and wireless communications circuitry.

Device 92 may include input-output devices 96. Input-output devices 96 may be used to allow a user to provide device 92 with user input. Input-output devices 96 may also be used to gather information on the environment in which device 92 is operating. Output components in devices 96 may allow device 92 to provide a user with output and may be used to communicate with external electrical equipment.

As shown in FIG. 10, input-output devices 96 may include one or more displays such as display(s) 100. Display(s) 100 may be used to display images. The images may be viewed by a user of device 92 and/or by others in the vicinity of the user. Display(s) 100 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

In configurations where device 92 is a head-mounted device, displays 100 may include one or more displays that present computer-generated content such as virtual reality content and mixed reality content to a user. Virtual reality content may be displayed in the absence of real-world content. Mixed reality content, which may sometimes be referred to as augmented reality content, may include computer-generated images that are overlaid on real-world images. The real-world images may be captured by a camera (e.g., a forward-facing camera) and merged with overlaid computer-generated content or an optical coupling system may be used to allow computer-generated content to be overlaid on top of real-world images. As an example, a pair of mixed reality glasses or other augmented reality head-mounted display may include a display device that provides images to a user through a beam splitter, prism, holographic coupler, or other optical coupler. Configurations in which a rear-facing display displays virtual reality content to a user through lenses may also be used. This is merely illustrative, however. If desired, device 92 may be a handheld electronic device such as a cellular telephone, tablet computer, etc.

Input-output circuitry 96 may include sensors 98. Sensors 98 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based proximity sensors, other proximity sensors, strain gauges, gas sensors, pressure sensors, moisture sensors, magnetic sensors, audio sensors (microphones), ambient light sensors, microphones for gathering voice commands and other audio input, optical proximity sensors, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 96. If desired, input-output devices 96 may include other devices 102 such as haptic output devices (e.g., vibrating components), light-emitting diodes and other light sources, speakers such as ear speakers for producing audio output, and other electrical components. Device 92 may include circuits for receiving wireless power, circuits for transmitting power wirelessly to other devices, batteries and other energy storage devices (e.g., capacitors), joysticks, buttons, and/or other components.

Electronic device 92 may have housing structures (e.g., housing walls, etc.), as shown by illustrative support structures 104 of FIG. 10. In configurations in which electronic device 92 is a head-mounted device (e.g., a pair of glasses, goggles, a helmet, a hat, etc.), support structures 104 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 92 and may support display(s) 100, sensors 98, other components 102, other input-output devices 96, and control circuitry 94.

Device 92 may be configured to use one or more or sensors 98 to gather three-dimensional information on one or both of a user's ears. For example, a three-dimensional image may be captured using a three-dimensional sensor in device 92 (e.g., a forward-facing three-dimensional image sensor on the front face of a head-mounted device, a facial recognition sensor on a cellular telephone or tablet computer, etc.), a capacitive ear image may be captured using an array of capacitive electrodes in sensors 98, and/or any other sensor 98 in device 92 may be used to gather ear information on one or both of the user's ears. Once a three-dimensional image of the user's ear has been captured, control circuitry can identify an appropriate custom design (e.g., shape, size, materials, etc.) for earbuds 10. The control circuitry that identifies an appropriate design for earbuds 10 to accommodate the user's ears may be local control circuitry in device 92 such as control circuitry 94 and/or remote control circuitry that is associated with a remote server, wristwatch device, external cellular telephone, tablet computer, laptop computer, or other external equipment. If desired, display 100 may be used to display information associated with the custom design of earbuds 10 (e.g., a map of the user's ear(s), a rendering of a customized earbud 10, dimensions of a customized earbud 10, etc.).

After measuring the user's ears and identifying an appropriate earbud design to fit the user's ears, earbud 10 may be formed using three-dimensional weaving techniques. Customization operations may involve fabricating custom parts, assembling custom and/or stock parts together to form earbud 10, and/or performing other desired customization operations.

Figure 11:
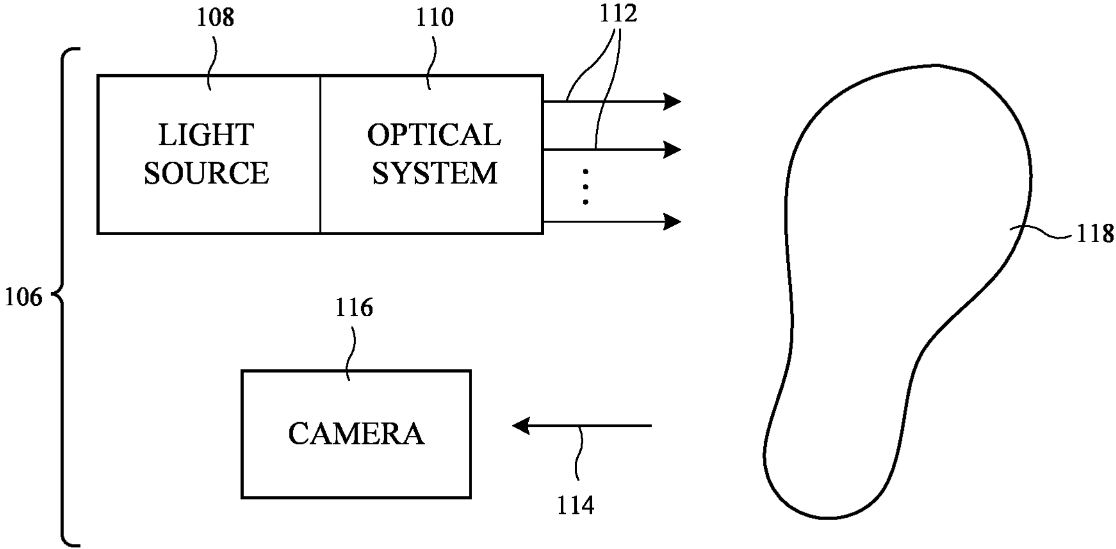
FIG. 11 is a diagram of a three-dimensional image sensor in accordance with an embodiment.

FIG. 11 is a diagram of an illustrative three-dimensional image sensor 106 of the type that may be used to capture a three-dimensional image of a user's ear. Light (e.g., infrared light and/or visible light) may be emitted by light source 108. Light source 108 may be, for example, a single laser, an array of vertical cavity surface emitting lasers or other laser diodes, one or more light-emitting diodes, or other source of light. During operation, light source 108 may emit one or more beams of light towards target object 118 (e.g., a user's ear). Optical system 110 may split these beams of light into additional beams 112 (e.g., to increase the total number of light beams 112 that are emitted). The number of beams 112 that illuminates target object 118 may be, for example, at least 100, at least 500, at least 2000, at least 10,000, at least 25,000, at least 50,000, fewer than 1,000,000, fewer than 300,000, fewer than 100,000, or fewer than 75,000 (as examples). Camera 116 includes a digital image sensor that is sensitive to the wavelength of light associated with beams 112 (e.g., infrared light at 900-1000 nm, at least 700 nm, at least 800 nm, less than 2.5 microns, or other suitable wavelength). This allows camera 116 to capture infrared images (or visible images) of object 118 while object 118 is covered with an array of spots produced by the illumination of object 118 with beams 112, thereby producing three-dimensional maps (three-dimensional images) of target 118. The three-dimensional images may, for example, include a three-dimensional image of a user's ear.

Figure 12:
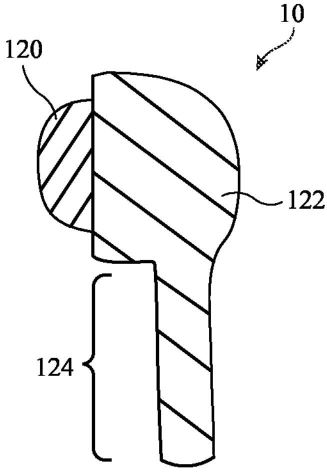
FIG. 12 is a side view of an illustrative fabric-based earbud with customized fit and materials in accordance with an embodiment.

FIG. 12 is a side view of an illustrative earbud formed from three-dimensional fabric 14 (e.g., fabric made using techniques of the type shown in FIGS. 3-9 and/or fabric formed using other three-dimensional weaving techniques) that has been customized based on ear images such as three-dimensional ear images captured using sensor 106 or other sensor 98 in device 92. Earbud 10 may, for example, include customized portions such as customized portions 120 and 122.

One or both of customized portions 120 and 122 may be formed from fabric 14. Fabric 14 may include warp strands 24 and weft strands 22 that are formed in separate steps as discussed in connection with FIG. 3, if desired. During warp laying operations, warp strands 24 may be laid on needles 44 to form layers 24L of warp loops. After all of warp strands 24 have been laid on needles 44, weft insertion operations may begin. Weft strands 22 (which may include one or more of the same strands that form warp strands 24) may be threaded through eyelets of the needles on which warp strands 24 are laid. Each needle 44 may be pulled through a stacks of loops to thereby insert a given weft strand into the stack of loops. When all needles 44 have been removed and weft strands inserted in their place, three-dimensional woven fabric 14 may have a shape of the type shown in FIG. 12 (or any other suitable shape depending on the desired design).

In the example of FIG. 12, which is illustrative, the housing of earbud 10 includes a main portion (e.g., a bulbous portion with a curved cross-sectional profile) that is configured to be received within the ear of a user and includes an elongated portion that extends from the main portion such as stalk portion 124 (sometimes referred to as the tail portion of the housing). Other shapes may be used for the housing of earbud 10, if desired.

Customized portions 120 and 122 may be woven based on the three-dimensional images of the user's ears captured using device 92. In particular, ear images captured by sensor 106 or other sensor 98 in device 92 may be processed to determine the dimensions of different parts of the user's ear such as the concha (e.g., the concha bowl), tragus, antitragus, canal, cymba concha, helical crus, intertragal notch, helix, etc. These dimensions may be used to produce an earbud with appropriate dimensions and materials. For example, the antitragus and tragus portions of the ear may be more sensitive than other parts of the ear such as the concha bowl. With this in mind, tragus and antitragus portions of earbud 10 (e.g., portions 120 of earbud 10 that contact the tragus and/or antitragus of the ear) may be formed using dimensions that match line-to-line or with a modest level of clearance with the dimensions of the tragus and antitragus portions of the user's ear to avoid user discomfort. In contrast, concha bowl portions of earbud 10 (e.g., portions 122 of earbud 10 that contact the tragus and/or antitragus of the ear) need not match line-to-line with the dimensions of the user's concha bowl. Since the concha is typically less sensitive than other parts of the ear, some compressive force in this region may be acceptable and may help hold earbud 10 within the ear. Using the captured ear images, three-dimensional fabric having the precise dimensions for the user's ear anatomy (e.g., tragus and antitragus portions 120 of earbud 10 matching the dimensions of the tragus and antitragus portions of the ear, concha portions 122 of earbud 10 being slightly larger than the dimensions of the concha portion of the ear, etc.) may be formed to produce customized earbuds 10.

Figure 13:
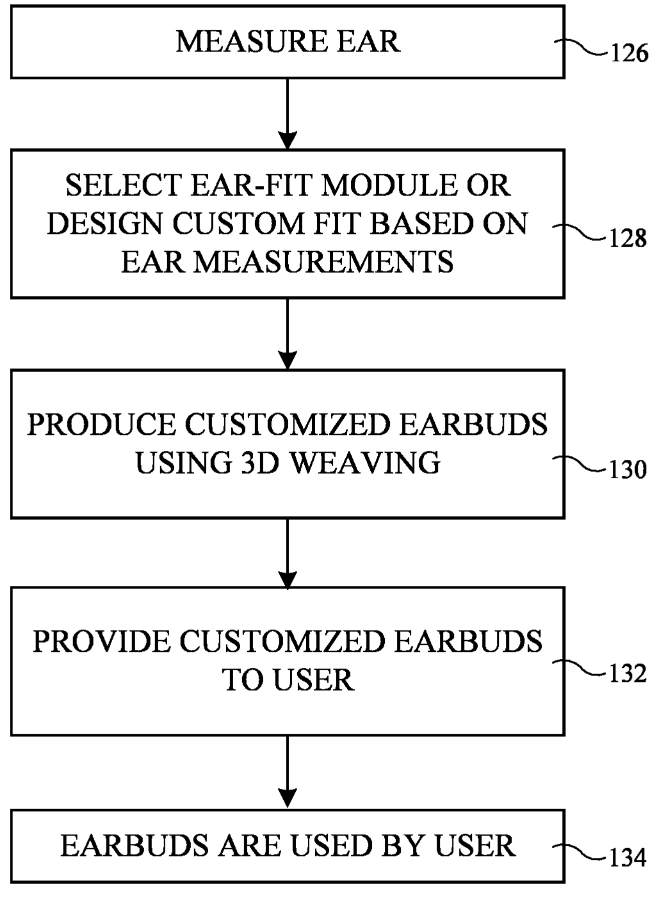
FIG. 13 is a flow chart of illustrative operations associated with forming and using customized fabric-based earbuds in accordance with an embodiment.

A flow chart of illustrative operations involved in forming customized earbuds is shown in FIG. 13.

During the operations of block 126, one or both of a user's ears may be measured. The user's ears may be measured by using one or more sensors 98 in device 92. As described in connection with FIG. 11, one illustrative technique for measuring the user's ear involves capturing a three-dimensional image of the user's face with a three-dimensional sensor. The three-dimensional sensor may be a structured light sensor of the type shown in FIG. 11 or other suitable three-dimensional image sensor. If desired, three-dimensional images may also be captured by rotating the user's ear relative to a single camera while capturing a series of images with the single camera.

The three-dimensional image sensor that is used in capturing the three-dimensional image of the user's ear may be located in device 92 (e.g., a device used by the same user for which earbuds 10 are customized). For example, a computer, cellular telephone, wristwatch, external head-mounted device, or other external electronic device may capture a three-dimensional image of one or both of the user's ears.

The three-dimensional images of the user's ears may be analyzed during the operations of block 128 to determine how to customize earbuds 10 for the user. The three-dimensional images may be processed using control circuitry in the equipment that contains the three-dimensional image sensor (e.g., control circuitry 94 of device 92) or, using wired and/or wireless communications links, an image captured locally on device 92 and/or on external equipment may be transmitted to other suitable processing circuitry for further analysis. For example, a remote server, a peer electronic device, device 92, computing equipment associated with a weaving system (e.g., the weaving system of FIG. 3) and/or other external equipment may be used in analyzing a three-dimensional image captured using the three-dimensional image sensor in device 92 or captured using a three-dimensional image sensor in another electronic device. In arrangements in which images are captured and processed locally by device 92, control circuitry 94 in device 92 may use the three-dimensional image sensor in device 92 to capture the user's ear features in a three-dimensional image and may perform processing operations on the three-dimensional image to determine what dimensions, shapes, and materials are appropriate for earbud 10. This may include, for example, selecting one of multiple custom options (e.g., options with predetermined dimensions where one fits most closely to the user's ear anatomy) and/or may include designing custom-fit earbuds with dimensions that are mostly or entirely determined by the ear images. These ear image analysis operations may identify features of the user's ear such as dimensions, shape, and location of the concha (e.g., the concha bowl), tragus, antitragus, canal, cymba concha, helical crus, intertragal notch, helix, etc., and/or other aspects of the user's ear.

By analyzing the shape of the user's ear, the control circuitry of device 92 and/or of the remove server that receives the ear images can identify an appropriate custom version of earbuds 10 for the user. The control circuitry may, for example, identify a suitable ear-fit module (e.g., portion 120 and/or 122 of earbud 10) from a set of available prefabricated ear-fit modules with different characteristics. The different ear-fit modules may, for example, include ear-fit modules suitable for ears of different size, shapes, sensitivities, etc. The control circuitry that identifies the appropriate ear-fit module for the user during the operations of block 128 may be control circuitry 94 of device 92, may be a server or other online computing equipment to which a three-dimensional image was transferred for processing such as a server associated with an online store that sells custom versions of earbuds 10, and/or may be other suitable control circuitry. This is merely illustrative, however. If desired, earbuds 10 may be designed mostly or entirely from scratch based on ear images and may not include any prefabricated portions.

After identifying an appropriate earbud design for the user, that design may be produced during the operations of block 130 using three-dimensional weaving equipment (e.g., equipment of the type shown in FIGS. 3-9 or other three-dimensional weaving equipment). This may include, for example, laying warp strands 24 and inserting weft strands 22 in separate steps as discussed in connection with FIG. 3. During warp laying operations, warp strands 24 may be laid on needles 44 to form layers 24L of warp loops. After all of warp strands 24 have been laid on needles 44, weft insertion operations may begin. Weft strands 22 (which may include one or more of the same strands that form warp strands 24) may be threaded through eyelets of the needles on which warp strands 24 are laid. Each needle 44 may be pulled through a stacks of loops to thereby insert a given weft strand into the stack of loops. When all needles 44 have been removed and weft strands inserted in their place, three-dimensional woven fabric 14 may have a shape of the type shown in FIG. 12 (or any other suitable shape depending on the desired earbud design). The three-dimensional fabric 14 that forms all or part of earbud 10 may have the precise dimensions for the user's ear anatomy (e.g., tragus and antitragus portions 120 of earbud 10 matching the dimensions of the tragus and antitragus portions of the ear, concha portions 122 of earbud 10 being slightly larger than the dimensions of the concha portion of the ear, etc.).

Once customized earbud 10 has been formed, the customized earbud 10 may be provided to the user during the operations of block 132 and may be used by the user during the operations of block 134. In particular, a user may place the customized earbud 10 in his or her ear and may listen to associated audio using speakers supported by the housing of earbud 10.

As described above, one aspect of the present technology is the gathering and use of three-dimensional images of a user's ear and other data available from various sources to improve the use of device 10. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, facial information, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide facial data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A method for forming a three-dimensional woven fabric earbud, the method comprising:

with a sensor, capturing a three-dimensional ear image; and with three-dimensional weaving equipment, weaving a stack of warp strand segments with weft strand segments, wherein the warp strand segments and the weft strand segments are configured to form a three-dimensionally woven tragus portion and a three-dimensionally woven concha portion having dimensions that are based on the three-dimensional ear image, and wherein the three-dimensionally woven tragus portion and the three-dimensionally woven concha portion are structural portions for holding circuitry of the three-dimensional woven fabric earbud.

2. The method defined in claim 1 further comprising:

identifying ear features in the three-dimensional ear image, wherein the ear features include tragus dimensions, antitragus dimensions, and concha bowl dimensions.

3. The method defined in claim 2 wherein weaving the stack of warp strand segments with weft strand segments comprises forming a three-dimensionally woven antitragus portion.

4. The method defined in claim 3 wherein the three-dimensionally woven tragus portion and the three-dimensionally woven antitragus portion match the tragus dimensions and the antitragus dimensions, respectively.

5. The method defined in claim 3 wherein the three-dimensionally woven concha portion is larger than the concha bowl dimensions.

6. The method defined in claim 1 wherein the three-dimensional weaving equipment includes:

an array of needles;

warp laying equipment that guides the warp strand segments around the array of needles to form the stack of warp loops on the needles; and weft insertion equipment that inserts the weft strand segments through the stack of warp loops.

7. The method defined in claim 6 wherein the warp laying equipment comprises a computer-controlled positioner that positions the warp strand segments around the array of needles and wherein at least some of the warp strand segments and the weft strand segments are formed from a single continuous strand.

8. The method defined in claim 6 wherein the stack of warp loops comprises multiple layers of warp loops stacked on top of one another at different locations along lengths of the needles.

9. The method defined in claim 8 wherein each of the layers of warp loops extends in a plane that is perpendicular to the lengths of the needles.

10. The method defined in claim 6 further comprising support plates that support the array of needles.

11. A fabric-based earbud, comprising:

layers of warp strand segments; and weft strand segments woven with the warp strand segments, wherein at least some of the warp strand segments and the weft strand segments are formed from a single continuous strand, wherein the layers of warp strand segments and the weft strand segments form a three-dimensionally woven tragus portion and a three-dimensionally woven antitragus portion of the fabric-based earbud, and wherein the three-dimensionally woven tragus portion and the three-dimensionally woven antitragus portion are structural portions for holding circuitry of the fabric-based earbud.

12. The fabric-based earbud defined in claim 11 wherein the layers of warp strand segments and the weft strand segments form a three-dimensionally woven concha bowl portion.

13. The fabric-based earbud defined in claim 12 wherein the three-dimensionally woven tragus portion, the three-dimensionally woven antitragus portion, and the three-dimensionally woven concha bowl portion have dimensions that are based on a three-dimensional ear image.

14. The fabric-based earbud defined in claim 13 wherein the three-dimensional ear image indicates tragus and antitragus dimensions and wherein the three-dimensionally woven tragus portion and the three-dimensionally woven antitragus portion match the respective tragus and antitragus dimensions.

15. The fabric-based earbud defined in claim 13 wherein the three-dimensional ear image indicates concha bowl dimensions wherein the three-dimensionally woven concha bowl portion is larger than the concha bowl dimensions.

16. A three-dimensional woven fabric earbud, comprising:

a stack of warp strand segments; and weft strand segments woven with the warp strand segments, wherein the warp strand segments and the weft strand segments are configured to form a three-dimensionally woven tragus portion and a three-dimensionally woven concha portion having dimensions that are based on a three-dimensional ear image and wherein the three-dimensionally woven tragus portion and the three-dimensionally woven concha portion are structural portions for holding circuitry of the three-dimensional woven fabric earbud.

17. The three-dimensional woven fabric earbud defined in claim 16 wherein the stack of warp strand segments forms at least part of a tube.

18. The three-dimensional woven fabric earbud defined in claim 16 wherein three-dimensional ear image indicates tragus dimensions and concha dimensions, wherein the three-dimensionally woven tragus portion matches the tragus dimensions, and wherein the three-dimensionally woven concha portion is larger than the concha dimensions.

19. The three-dimensional woven fabric earbud defined in claim 16 wherein the warp strand segments form finished warp ends without stitches at an edge of the three-dimensional woven fabric earbud.

20. The three-dimensional woven fabric earbud defined in claim 16 wherein the stack of warp strand segments comprises multiple layers of loops arranged on top of one another and wherein each of the weft strand segments passes through the multiple layers of loops.

* * * * *